(12) United States Patent
Ruider

(10) Patent No.: US 11,988,254 B2
(45) Date of Patent: May 21, 2024

(54) DOG CLUTCH ASSEMBLY, POWERTRAIN, AND MOTOR VEHICLE

(71) Applicant: ZF FRIEDRICHSHAFEN AG, Friedrichshafen (DE)

(72) Inventor: Martin Ruider, Schwarzhofen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/272,940

(22) PCT Filed: Jan. 18, 2022

(86) PCT No.: PCT/EP2022/050999
§ 371 (c)(1),
(2) Date: Jul. 18, 2023

(87) PCT Pub. No.: WO2022/157141
PCT Pub. Date: Jul. 28, 2022

(65) Prior Publication Data
US 2024/0093735 A1 Mar. 21, 2024

(30) Foreign Application Priority Data
Jan. 21, 2021 (DE) ...................... 10 2021 200 501.2

(51) Int. Cl.
*F16D 11/14* (2006.01)
(52) U.S. Cl.
CPC .................................. *F16D 11/14* (2013.01)
(58) Field of Classification Search
CPC ..... F16D 11/14; F16D 11/00–16; F16H 48/24
See application file for complete search history.

(56) References Cited

U.S. PATENT DOCUMENTS

| 4,890,686 A | * | 1/1990 | Hamada | B60K 23/08 |
| | | | | 701/69 |
| 2012/0316023 A1 | * | 12/2012 | Bausch | F16H 57/02004 |
| | | | | 475/150 |

(Continued)

FOREIGN PATENT DOCUMENTS

| DE | 2936968 | | 4/1981 | |
| DE | 102010045898 A1 | * | 10/2011 | ............. F16D 11/14 |

(Continued)

OTHER PUBLICATIONS

Office Action for corresponding German Patent Application No. DE 10 2021 200 501.2.

*Primary Examiner* — Stacey A Fluhart
*Assistant Examiner* — Aimee Tran Nguyen
(74) *Attorney, Agent, or Firm* — Cozen O'Connor

(57) ABSTRACT

A dog clutch arrangement for a motor vehicle having a clutch body. The clutch body has first teeth in a first toothing and an axially movable sliding sleeve arrangement with second teeth in a second toothing. The sliding sleeve arrangement has a shift ring and a sleeve with the second toothing. The shift ring and the sleeve at least partially overlap in axial direction and are arranged to be axially displaceable relative to one another. The shift ring and the sleeve enclose an intermediate space, a pneumatic damping which damps the movement of the sleeve and the shift ring relative to one another being formed with the intermediate space.

17 Claims, 5 Drawing Sheets

(56) References Cited

U.S. PATENT DOCUMENTS

2018/0100569 A1* 4/2018 Imafuku ................. F16D 23/00
2019/0001951 A1* 1/2019 Kohlböck ........... B60W 10/108

FOREIGN PATENT DOCUMENTS

| DE | 102012210298 | 12/2013 | |
|----|----|----|----|
| DE | 102012221065 | 5/2014 | |
| DE | 102013019093 | 5/2015 | |
| DE | 102018213163 | 2/2020 | |
| DE | 102019203255 | 9/2020 | |
| WO | WO 2020182630 | 9/2020 | |
| WO | WO-2020182630 A1 * | 9/2020 | ............. F16D 11/04 |
| WO | WO 2021244699 | 12/2021 | |

* cited by examiner

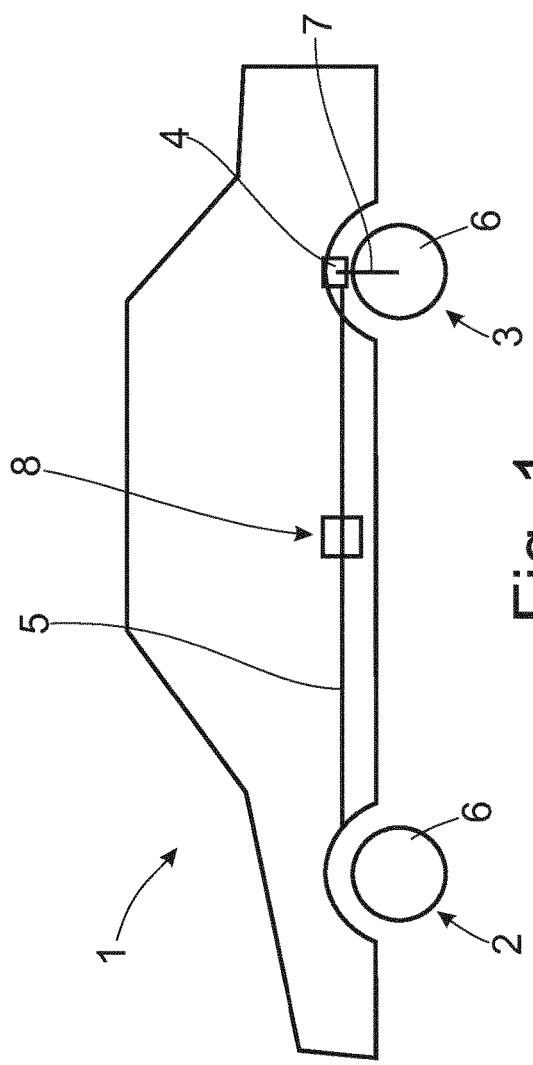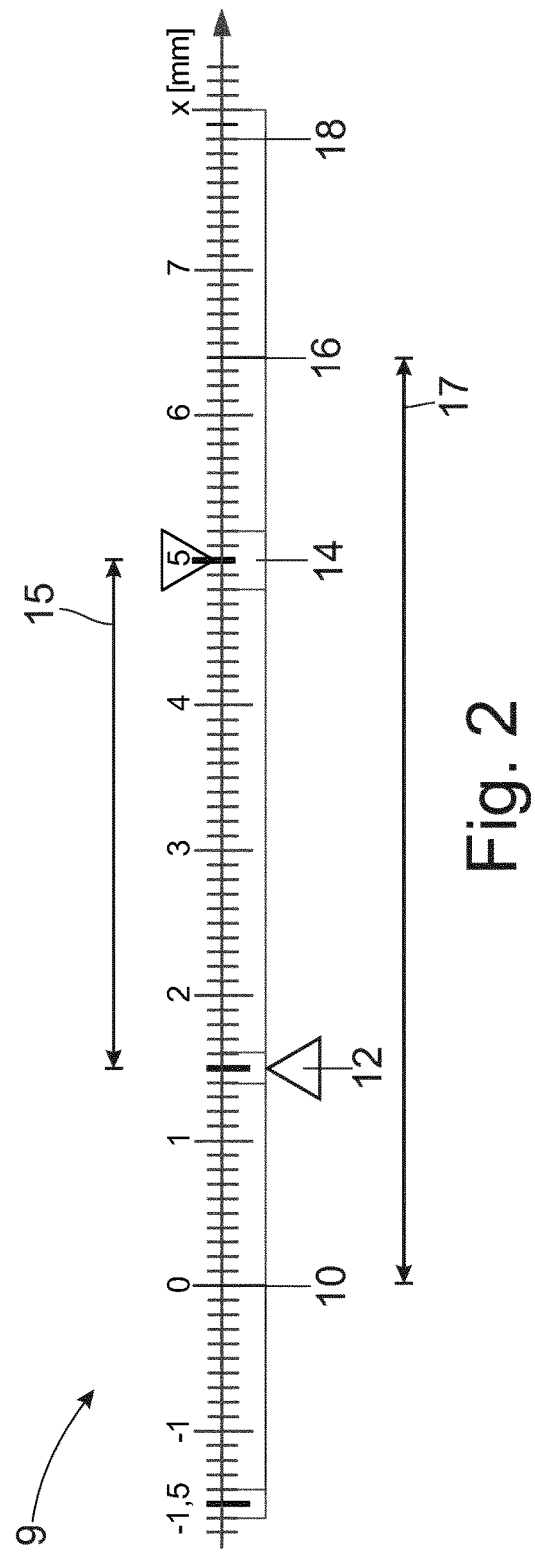

DOG CLUTCH ASSEMBLY, POWERTRAIN, AND MOTOR VEHICLE

CROSS REFERENCE TO RELATED APPLICATIONS

This is a U.S. national stage of Application No. PCT/EP2022/050999 filed Jan. 18, 2022. Priority is claimed on German Application No. DE 10 2021 200 501.2 filed Jan. 21, 2021, the content of which is incorporated herein by reference.

BACKGROUND OF THE INVENTION

1. Field of the Invention

The disclosure is directed to a dog clutch arrangement for a motor vehicle having a clutch body that has first teeth in a first toothing and an axially movable sliding sleeve arrangement with second teeth in a second toothing. The sliding sleeve arrangement has a shift ring and a sleeve with a second toothing, and the shift ring and the sleeve at least partially overlap in axial direction and are arranged to be axially displaceable relative to one another.

2. Description of the Related Art

Dog clutches have the advantage of good efficiency because no friction losses occur. For this reason, they are preferred when a clutch with a good efficiency is to be achieved and the synchronization of speed is carried out by an overriding system.

It is possible for a sliding sleeve arrangement to be constructed in a two-part manner comprising shift ring and sleeve. The sleeve and the shift ring can then be moved axially with respect to one another. A relative movement is then possible between the sleeve and shift ring when engaging or disengaging. For example, the sleeve and the shift ring can be slid apart during actuation due to a tooth-on-tooth position of the sleeve with the clutch body.

If the sleeve and the shift ring then move toward one another again after the blocking of the sleeve movement has been overcome, contact noise can occur.

SUMMARY OF THE INVENTION

In view of the foregoing, it is an object of one aspect of the present invention to provide a dog clutch arrangement in which the shift ring and the sleeve are moved together without noise and which is constructed in a simple manner.

According to one aspect of the invention, it is provided that the shift ring and the sleeve enclose an intermediate space, and a pneumatic damping that damps the movement of the sleeve and the shift ring relative to one another is formed with the intermediate space.

According to one aspect of the invention a damping mechanism that prevents mechanical impact noises is formed in the dog clutch arrangement itself. To this end, it is provided that the shift ring and the sleeve enclose an intermediate space. This intermediate space advantageously has a variable volume so that a fluid, particularly air or an air-oil mixture, can be compressed therein. A damping of the relative movement of the sleeve and shift ring with respect to one another can then be achieved with this compressed air volume.

It can generally be provided that the intermediate space between the shift ring and sleeve surrounds a predetermined uncompressed volume, and the air could be enclosed, for example, in a kind of annular groove. However, it is preferable that the shift ring and the sleeve form the wall of the intermediate space and at least one pneumatic and/or hydraulic inlet valve is arranged at the wall. Air or an air-oil mixture can be introduced on demand into the intermediate space via this inlet valve when its volume increases when the shift ring and the sleeve move apart. The inlet valve is preferably formed as a check valve. This means that air can enter the intermediate space via the inlet valve, but cannot exit the intermediate space.

Alternatively, the inlet valve can also function as an outlet valve, that is, it basically inhibits the exchange of air.

Further, the shift ring and the sleeve can form the wall of the intermediate space and at least one defined leak can be arranged at the wall. A predetermined amount of air per time unit can escape via the leak. In this way, the time and intensity of the damping effect of the air present in the intermediate space can be determined.

Accordingly, it is preferably provided that there is a first position of the sleeve relative to the shift ring in which the intermediate space has a small volume. Further, there is a second position in which the intermediate space is enlarged and in which the sleeve and the shift ring are spread apart. The intermediate space then has a larger volume. If the sliding sleeve arrangement is moved from the second position into the first position, the movement is damped after a determined decrease in the intermediate space because of the damping intrinsically provided in the sliding sleeve arrangement. For this purpose, the intermediate space can have at least one connection to the exterior space in order to enable a complete reduction of the intermediate space and to achieve a damping effect without permanent restoring forces.

In a first aspect, a bore hole can be arranged in the sleeve and/or the shift ring. A bore hole is a kind of choke which inhibits the exchange of air between the intermediate space and the exterior space. Accordingly, the air in the intermediate space cannot escape as quickly as may be desired when the sleeve and shift ring move toward one another, and the movement is damped just at the end. However, the air can escape from the intermediate space with a certain delay.

Alternatively or in addition, a sealing element can be arranged between the shift ring and the sleeve. This sealing element can preferably be formed as a lip seal ring. A sealing ring of this kind may be considered as a type of check valve. An inlet is preferably defined via the lip seal ring. Accordingly, owing to its arrangement, it allows air into, but not out of, the intermediate space.

The outlet can be produced, for example, by a defined leak. This leak can be a bore hole or a predetermined gap between the shift ring and sleeve when it is producible with a suitable tolerance. For example, it can be provided that there is a gap between a contact surface of the shift ring and sleeve or that the surfaces define a gap which allows a predetermined leak. The gap can extend over the entire width of the component, but it can also have a narrow diameter. As has already been described, the defined leak can also be produced by a bore hole.

Alternatively, or in addition, an orifice can be arranged at the wall of the intermediate space, i.e., in the sleeve or the shift ring. The orifice can regulate the inlet and outlet of air into and out of the intermediate space. In so doing, a preferred direction can be given, but the orifice can also exhibit a flow resistance in both directions equally.

Several steps can also be provided simultaneously. For example, a lip seal ring which functions as a kind of inlet valve can be provided between the shift ring and the sleeve. Additionally, an orifice or another defined leak can be located at the shift ring. A defined air inlet through which large quantities of air can easily arrive in the intermediate space can be produced in this way. On the other side, there is also a defined outlet having an outlet capability that is less than the inlet capability of the lip seal ring. More generally, the intermediate space can preferably have an inlet and an outlet which is separate from the inlet, and the inlet volume flow or the inlet cross-sectional area is greater than the outlet volume flow or outlet cross-sectional area. In particular, it can also be provided that the outlet is also an inlet. The inlet area or the inlet volume is then increased even more relative to the outlet volume. In this way, it is brought about that the moving apart of the sleeve and shift ring apart can be effected without damping action and the damping only occurs when they are moved together.

The advantage in this construction consists in that the intermediate space is minimal when the sliding sleeve and shift ring move together and an effective damping volume is provided only when needed. Moreover, the effect is anisotropic, i.e., the damping of the movement acts in only one direction.

It will be noted that a pneumatic damping is mentioned and that only air is taken into consideration although, in practice, an air-oil mixture is usually available for a dog clutch in a transmission. Of course, a portion of oil can also enter the intermediate space. However, because of the rotational movement of the dog clutch, this oil is automatically pressed out again and it represents at most a slight proportion of the volume of the intermediate space and may therefore be disregarded.

The shift ring and/or the sleeve can advantageously be formed in an L-shaped manner in cross section. In particular, the arms of the L-shaped sleeve and/or of the L-shaped shift ring can form the wall of the intermediate space. This configuration is the preferred execution of the general idea that the intermediate space is formed exclusively by the sleeve and the shift ring. Accordingly, there is no need for additional wall components to secure the intermediate space. There are also alternative configurations, for example, a U-shaped sleeve and a shift ring fitting the latter in a corresponding manner. However, these are expensive to produce and complicated to handle.

The shift ring and the sleeve can preferably be decoupled over a predetermined path by a decoupling element. In other words, the shift ring and/or the sleeve can be moved relative to one another for a certain distance, namely, the predetermined distance, without the other part having to move along with it. On the other hand, they are not completely decoupled because, otherwise, they could not be engaged jointly. But they can be decoupled for a predetermined distance.

The shift ring and the sleeve are preferably decoupled for a predetermined distance exclusively in engagement direction. For example, the shift ring and the sleeve can be coupled continuously in disengagement direction or continuously starting from a certain position.

The decoupling element, particularly a spring element, can advantageously be arranged at the sliding sleeve arrangement. Faster shifting processes and lower losses can be realized in this way. In particular, the actuation process can also be carried out in a simplified manner with the described arrangement.

Accordingly, the dog clutch comprises two parts. The first part is called the clutch body and is substantially stationary. By "stationary" is meant herein that it is movable to such a slight extent that its axial movability cannot unintentionally engage the dog clutch. The clutch body is preferably arranged in such a way that it is free from play.

The dog clutch arrangement has a sliding sleeve arrangement as axially movable part for engagement. This sliding sleeve arrangement is formed of two parts, and the two parts are coupled with one another via a spring element. The sleeve has the toothing, while a shift ring is provided on the shift fork side. This shift ring is preferably annular but can also have different shapes. In terms of function, it merely transfers the force coming from an actuator to the spring element that connects the shift ring to the sleeve.

The spring element can preferably have a travel distance that is smaller than the overlap of the sleeve. The overlap is the maximum distance that the meshing teeth lie one above the other in axial direction. Accordingly, the travel distance is sufficiently large for the teeth to mesh after a tooth-on-tooth position has been overcome but not so large that the engagement position of the actuator is reached during a tooth-on-tooth position.

The sleeve can preferably have a stop that spans the spring arrangement in disengagement direction. The spring element is then functional exclusively in engagement direction.

The dog clutch arrangement can preferably have an actuator with an electric motor. This electric motor can have a position sensor. The position sensor can preferably be configured as a rotational angle sensor. The position of the shift ring can then also be determined via the rotational angle sensor and the geometric layout. As will be described in more detail below, the position of the sleeve can also be deduced taking into account boundary conditions in the described dog clutch arrangement. Therefore, a position sensor on the clutch body side can be omitted.

The actuator can preferably be formed electromechanically or electrohydraulically. Accordingly, it can also have a hydraulic portion for spanning longer distances.

Alternatively, a hydraulic actuator arrangement with a hydraulic control device can be used. Alternatively, a magnetic actuation is possible.

The spring element can preferably be formed as a plate spring. Further, the dog clutch arrangement can have a shift fork. This shift fork advantageously engages in the shift ring and displaces it in axial direction.

Alternatively, the spring element is formed as a wave spring. A wave spring is preferred particularly with larger spring paths.

More generally, the spring element is preferably formed annularly. A uniform transmission of force to the sleeve can be achieved in this way.

The shift toothing of the clutch body and sliding sleeve can extend in axial or radial direction. Further, the movable sliding sleeve has an axial or radial sliding toothing in addition.

The first teeth and/or the second teeth can advantageously extend in radial direction. As concerns the toothing, only the toothings of the clutch body and the sleeve have been mentioned so far. However, the sleeve can also be connected to a driveshaft via a toothing. The toothings can preferably be formed as fitting toothings. Alternatively, the toothings can be formed as face toothings. Further, a fitting toothing and a face toothing can also be used. In particular, a fitting toothing can be provided between the driveshaft and the sleeve, and the face toothing can be provided between the sleeve and the clutch body.

In addition, one aspect of the invention is directed to a powertrain for a motor vehicle with a first axle and a second axle. At least one wheel is arranged at each axle on each side, and a differential gear is arranged on at least one of the axles. The powertrain is characterized in that a dog clutch arrangement which is formed as described above is arranged between the differential gear and one of the wheels.

In addition, one aspect of the invention is directed to a powertrain for a motor vehicle with a first axle and a second axle, and at least one wheel is arranged at each axle on each side, and the two axles are connected via a propeller shaft. The powertrain is characterized in that a dog clutch arrangement as described above is arranged at the propeller shaft.

In addition, one aspect of the invention is directed to a powertrain for a motor vehicle with a first axle and a second axle, at least one wheel being arranged at each axle on each side. A gear ratio step is located between the rotor and the differential. A shaft, also called intermediate shaft, is part of this gear ratio step. It advantageously carries at least two spur gears. The powertrain is characterized in that a dog clutch arrangement as described above is arranged at the intermediate shaft.

In addition, one aspect of the invention is directed to a powertrain for a motor vehicle with a first axle and a second axle. At least one wheel is arranged at each axle on each side, and a differential gear is arranged on at least one of the axles. The powertrain is characterized in that a dog clutch arrangement as described above is arranged in the differential gear.

At least one electric motor, particularly a traction electric motor, is associated with each described powertrain. This electric motor can be decoupled from the rest of the powertrain with the dog clutch arrangement. The traction electric motor is referred to as such to distinguish it from other electric motors of the powertrain, such as the electric motor of the actuator of the dog clutch arrangement, for example. Of course, it has multiples of power output because it must drive the motor vehicle.

One aspect of the invention is further directed to a motor vehicle with a dog clutch arrangement and/or a powertrain. The motor vehicle is characterized in that the dog clutch arrangement and/or the powertrain are/is formed as described.

BRIEF DESCRIPTION OF THE DRAWINGS

Further features, advantages and particulars of the invention will become apparent from the following description of exemplary embodiments and figures. The drawings show:
FIG. 1 is a motor vehicle;
FIG. 2 is a path profile of an actuation process of a dog clutch.

DETAILED DESCRIPTION OF THE PRESENTLY PREFERRED EMBODIMENTS

Figure 3:
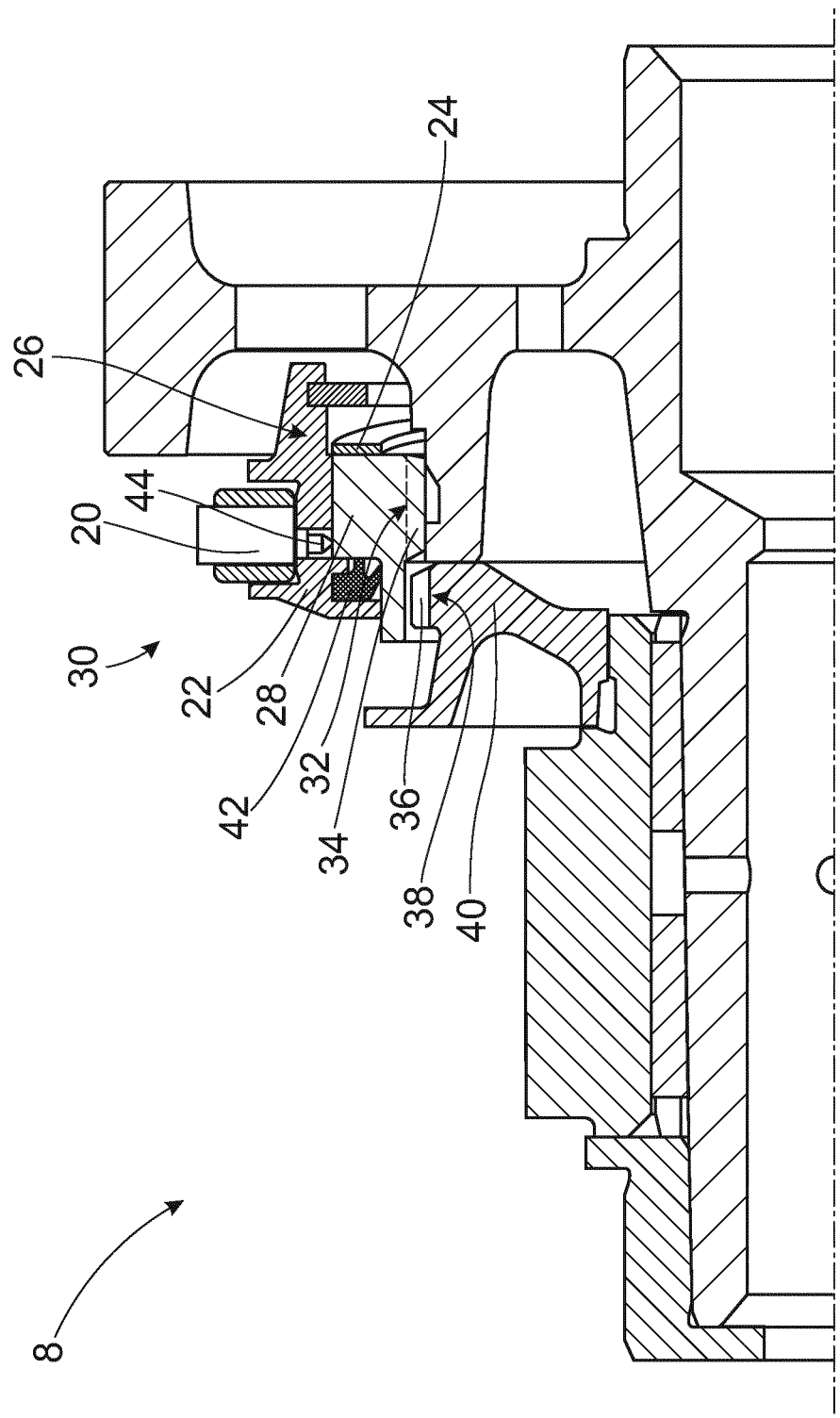
FIG. 3 is a dog clutch arrangement in a first position.

FIG. 1 shows a motor vehicle 1 with two axles 2 and 3. A differential 4 is arranged at at least one of the axles. The axles can be connected via an intermediate shaft 5. Side shafts 7, as they are called, are located between the differential and the wheels 6 of the axles. FIG. 1 further shows a dog clutch arrangement 8. This dog clutch arrangement 8 is shown at the propeller shaft 5 purely by way of example. But it can just as easily be arranged at the side shaft 7 or in the differential 4.

FIG. 2 shows the distance 9 of an actuation path. It is indicated in millimeters, but the indicated path lengths are basically arbitrary. The sequence of key points stated in the following is not limited to the indicated path lengths but, on the contrary, they can be adapted in individual cases.

The sliding sleeve of the dog clutch arrangement 8 is in the disengaged state at position 10. This can also be referred to as a disengagement position. If the sleeve is then displaced in an engagement direction, it reaches the tooth-on-tooth position 12 after a certain distance. Since the electric motor of the dog clutch arrangement 8 has a rotational angle sensor, it is known when this position is reached. Due to the fact that a spring element is arranged between the shift ring and the sleeve, as will be shown later, its travel distance 15 can easily be covered up to the block position 14. When the tooth-on-tooth position is overcome, the sleeve can also be moved farther in direction of the clutch body until it reaches the end position 16. The overlapping of the shift toothing is complete by the end position 16. The limiting of travel is effected either in the tooth base of the shift toothing or at a selected stop in the clutch body. The powertrain torque can be transmitted in its entirety at the end position 16.

The travel distance 15 is smaller than the engagement path 17. The engagement path 17 is the path traveled by the sleeve or the shift ring from position 10 to positon 16 during engagement.

FIG. 3 shows the dog clutch arrangement 8 in a first position, namely, the disengagement position. A portion of a shift fork 20 that engages in a shift ring 22 is shown. This shift ring 22 is connected to the sleeve 28 via a plate spring 24 as spring element 26. The shift ring 22, the plate spring 24 and the sleeve 28 together form the sliding sleeve arrangement 30.

The shift ring 22 and the sleeve 28 enclose an intermediate space 29, which is minimal in this position of the shift ring 22 and sleeve 28 with respect to one another. This position was also referred to earlier as first position.

Second teeth 34 are located at the sleeve 28 as second toothing 32.

These second teeth 34 are to be brought into engagement with first teeth 36 of the first toothing 38 of the clutch body 40.

The clutch body is axially stationary; that is, its axial movability is not sufficient to engage the dog clutch arrangement 8.

In FIG. 3, the dog clutch arrangement 8 is in the disengagement position 10.

Further, a seal 42 is arranged between the shift ring 22 and the sleeve 28. This seal 42 is used in cooperation with the orifice 44 to damp the movement of the sliding sleeve arrangement 30 as will be explained in more detail below.

Figure 4:
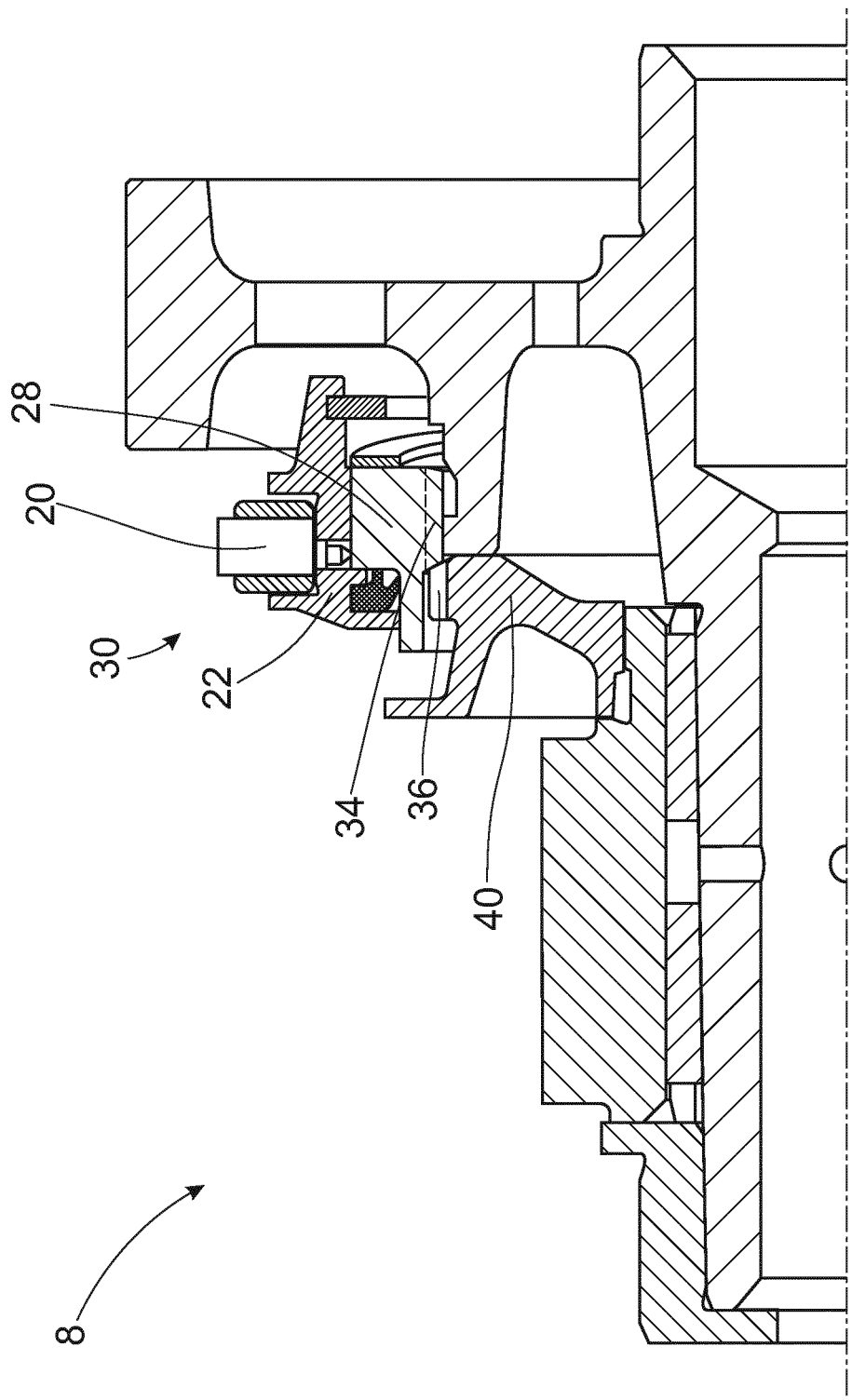
FIG. 4 is a dog clutch arrangement in a second position.

FIG. 4 shows the dog clutch arrangement 8 in the tooth-on-tooth position 12. The first teeth 36 and the second teeth 34 can be on top of one another. In this position, the tooth surfaces need not be directly on top of one another in their entirety; on the contrary, it is sufficient when a small portion overlaps. The teeth can then not move into the corresponding gaps. In spite of this, the actuator can move farther, since the spring element 26 initially follows the shift ring 22. If a tooth-on-tooth position exists, it can be ignored for the time being because the spring element 26 can then simply be preloaded. The tooth-on-tooth position between the first teeth 36 and the second teeth 34 is eventually canceled at least as long as there is a determined difference in speed. The toothings can then mesh with one another, which happens in an accelerated manner particularly when a spring element 26 is preloaded. After the tooth-on-tooth position 12, however, the shift ring 22 is preferably moved at a predetermined maximum velocity. This velocity is calculated in such a way that the tooth-on-tooth position is canceled before the travel 15 of the spring element 26 is exhausted. Of course, the difference in speed between the sleeve 28 and the clutch body 40 must be taken into account. The greater the difference, the faster the tooth-on-tooth position is overcome. For safety reasons, an upper threshold which may be referred to as a rejection limit speed, for example, can be provided. A clutch engagement process is not possible above this rejection limit speed.

The shift ring 22 and the sleeve 28 are not moved apart from one another until this position. The force of the plate spring 24 is sufficient to couple the movement of the sleeve 28 with that of the shift ring 22.

Figure 5:
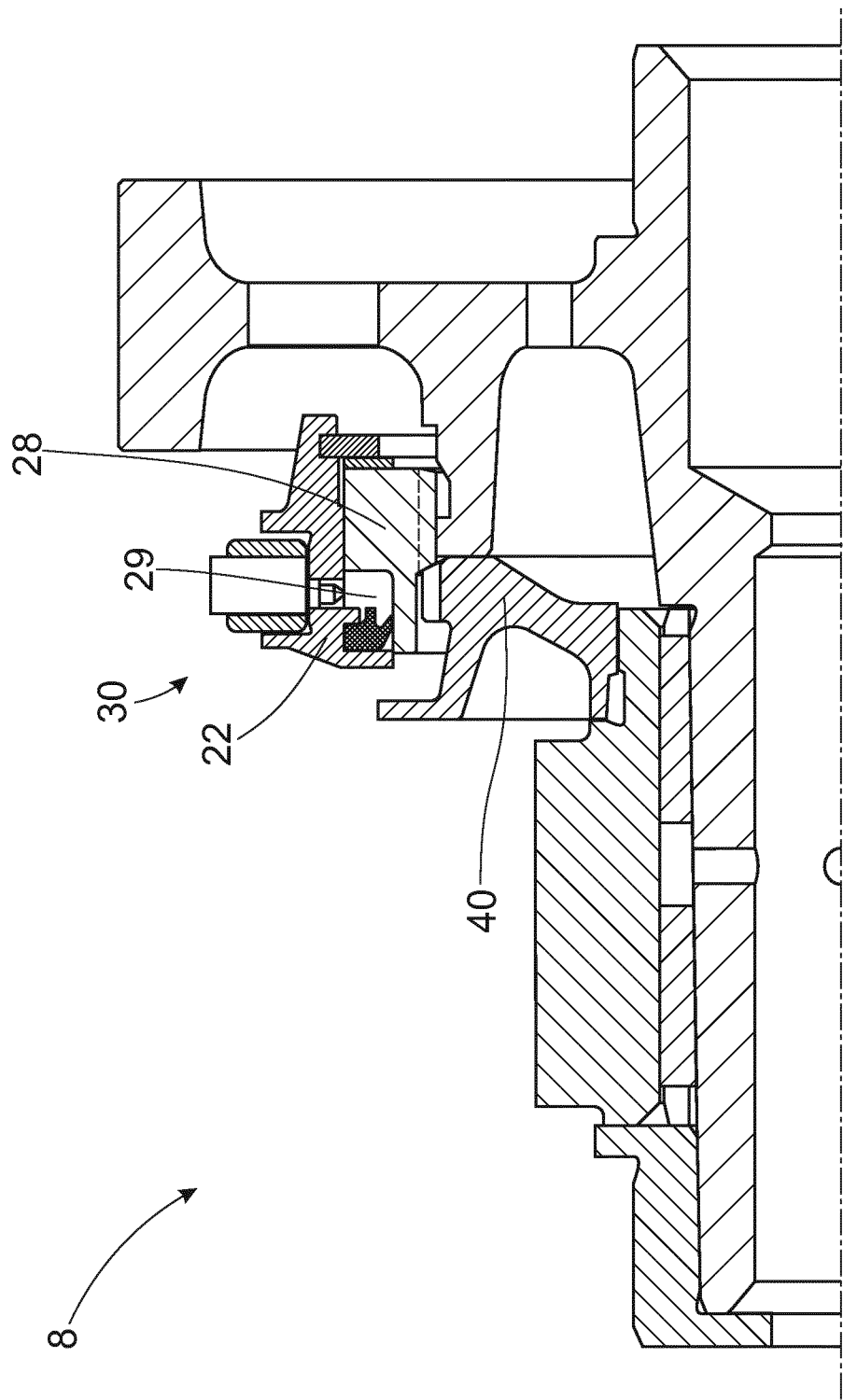
FIG. 5 is a dog clutch arrangement in a third position.

FIG. 5 shows the dog clutch arrangement 8 in a tooth-on-tooth position. This was also referred to earlier as second position. The sleeve 28 and the shift ring 22 have moved away from one another. The intermediate space 29 is appreciably enlarged in so doing. Located in the intermediate space 29 is air or an air-oil mixture that has arrived in the intermediate space 29 via the lip seal ring 42 and the orifice 44.

When the tooth-on-tooth position has been overcome, the shift ring 22 and the sleeve 28 are moved toward one another by the plate spring 24. A clattering noise at the end of this movement can be prevented because the air in the intermediate space 29 cannot escape quickly and is compressed. After decreasing by approximately 50%, the air is compressed in such a way that it damps the movement of the sleeve. Since the air can escape via the orifice 44, the distance between the shift ring 22 and sleeve 28 can decrease step by step until an axial relative position is reached such as that shown in FIGS. 3 and 4.

Figure 6:
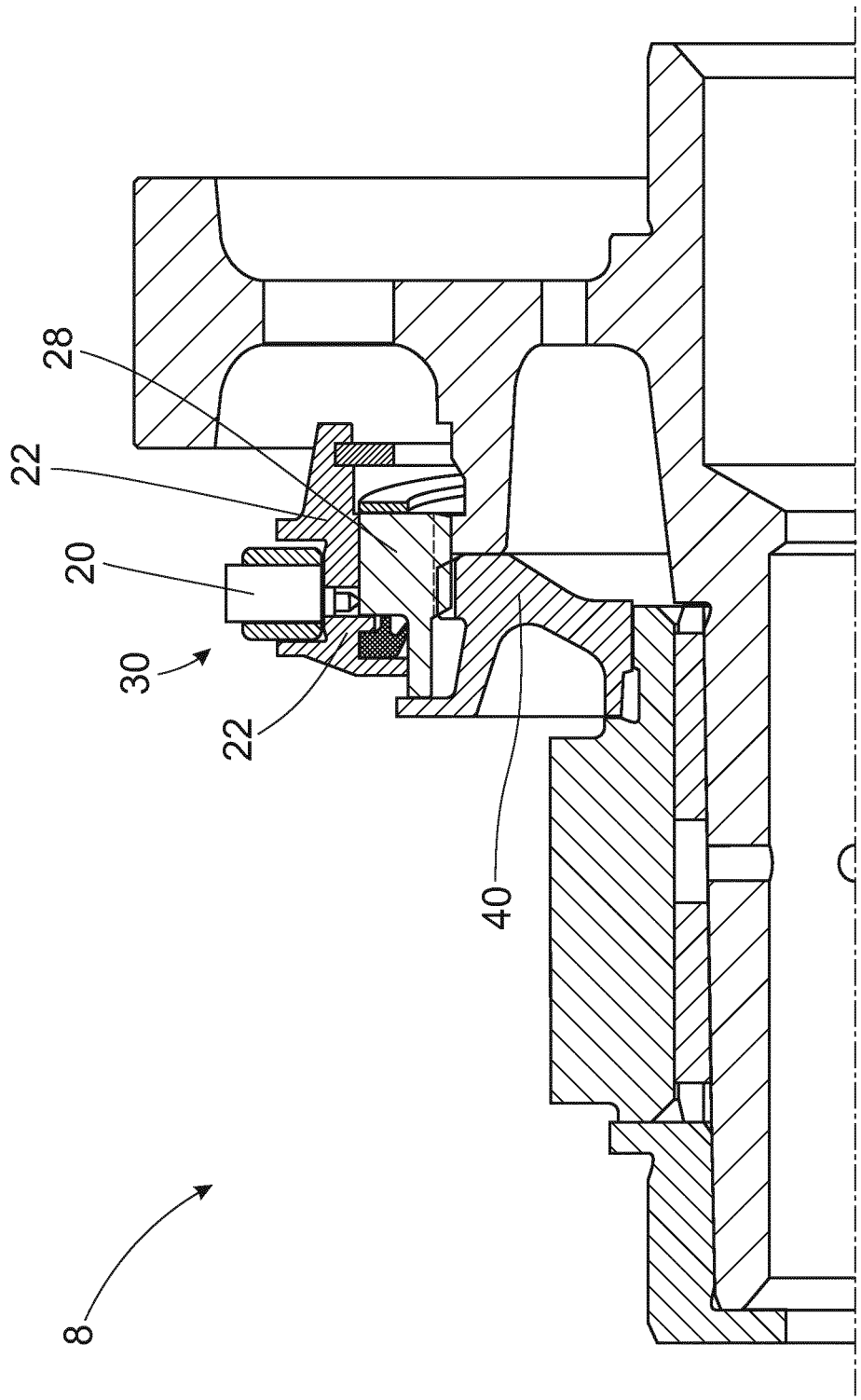
FIG. 6 is a dog clutch arrangement in a fourth position.

FIG. 6 shows the dog clutch arrangement 8 in the end position 16. The toothings are brought into engagement, in other words, mesh with one another, and overlap over a length such that the full torque of the electric motor of the powertrain can be transmitted.

The intermediate space 29 is again minimal. Accordingly, it is only increased for the time period in which the damping effect is needed.

FIGS. 3 to 6 show the same dog clutch arrangement 8 in different actuation positions. For the sake of clarity, only the essential components were provided with reference numerals in FIGS. 4 to 6. However, the reference numerals from FIG. 3 are still applicable.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A dog clutch arrangement for a motor vehicle comprising:
   a clutch body, wherein the clutch body comprises:
     first teeth in a first toothing;
     an axially movable sliding sleeve arrangement with second teeth in a second toothing,
     wherein the sliding sleeve arrangement has a shift ring and a sleeve with the second toothing; and
   a shift fork arranged to engage with the shift ring,
     wherein the shift ring and the sleeve at least partially overlap in axial direction and are arranged to be axially displaceable relative to one another,
     wherein the shift ring and the sleeve enclose an intermediate space, and
     a pneumatic damping that damps a movement of the sleeve and the shift ring relative to one another is formed with the intermediate space,
     wherein in a disengagement position and an engagement position of the first toothing and the second toothing the intermediate space is minimized and in a tooth-on-tooth position the intermediate space is maximized,
     wherein the shift fork is arranged radially in line with the intermediate space.

2. The dog clutch arrangement according to claim 1, wherein the shift ring and the sleeve form a wall of the intermediate space and at least one pneumatic and/or hydraulic inlet valve is arranged at the wall.

3. The dog clutch arrangement according to claim 2, wherein the inlet valve allows movements of fluid through into the intermediate space and chokes or prevents movements of fluid out of the intermediate space.

4. The dog clutch arrangement according to claim 2, wherein the shift ring and the sleeve form the wall of the intermediate space and at least one defined leak can be arranged at the wall.

5. The dog clutch arrangement according to claim 1, wherein a sealing element is arranged between the shift ring and the sleeve.

6. The dog clutch arrangement according to claim 2, wherein an orifice is arranged at the wall of the intermediate space.

7. The dog clutch arrangement according to claim 2, wherein the shift ring and/or the sleeve is formed L-shaped in cross section.

8. The dog clutch arrangement according to claim 7, wherein arms of the L-shaped sleeve and/or of the L-shaped shift ring form the wall of the intermediate space.

9. The dog clutch arrangement according to claim 1, wherein the shift ring and the sleeve are decoupled over a predetermined path by a decoupling element.

10. The dog clutch arrangement according to claim 9, wherein the decoupling element is formed as a spring element with a travel.

11. The dog clutch arrangement according to claim 9, wherein the decoupling element is arranged outside of the intermediate space.

12. A powertrain for a motor vehicle comprising:
   a first axle;
   a second axle;
   at least one wheel is arranged on each side of each axle;
   a differential gear is arranged on at least one of the axles; and
   a side shaft with a dog clutch arrangement is arranged between the differential gear and one of the wheels, wherein the dog clutch arrangement comprising:
  a clutch body, wherein the clutch body comprises:
    first teeth in a first toothing;
    an axially movable sliding sleeve arrangement with second teeth in a second toothing,
    wherein the sliding sleeve arrangement has a shift ring and a sleeve with the second toothing; and
    a shift fork arranged to engage with the shift ring,
    wherein the shift ring and the sleeve at least partially overlap in axial direction and are arranged to be axially displaceable relative to one another,
    wherein the shift ring and the sleeve enclose an intermediate space, and
    a pneumatic damping that damps a movement of the sleeve and the shift ring relative to one another is formed with the intermediate space,
    wherein in a disengagement position and an engagement position of the first toothing and the second toothing the intermediate space is minimized and in a tooth-on-tooth position the intermediate space is maximized,
    wherein the shift fork is arranged radially in line with the intermediate space.

13. A powertrain for a motor vehicle comprising:
  a first axle;
  a second axle;
  at least one wheel arranged on each side of each axle;
  wherein the two axles are connected via a propeller shaft; and
  wherein a dog clutch arranged at the propeller shaft comprising:
    a clutch body, wherein the clutch body comprises:
      first teeth in a first toothing;
      an axially movable sliding sleeve arrangement with second teeth in a second toothing,
      wherein the sliding sleeve arrangement has a shift ring and a sleeve with the second toothing; and
      a shift fork arranged to engage with the shift ring,
      wherein the shift ring and the sleeve at least partially overlap in axial direction and are arranged to be axially displaceable relative to one another,
      wherein the shift ring and the sleeve enclose an intermediate space, and
      a pneumatic damping that damps a movement of the sleeve and the shift ring relative to one another is formed with the intermediate space,
      wherein in a disengagement position and an engagement position of the first toothing and the second toothing the intermediate space is minimized and in a tooth-on-tooth position the intermediate space is maximized,
      wherein the shift fork is arranged radially in line with the intermediate space.

14. A powertrain for a motor vehicle comprising:
  a first axle;
  a second axle;
  at least one wheel arranged on each side of each axle;
  a differential gear arranged at at least one of the axles; and
  a dog clutch arrangement arranged in the differential gear comprising:
    a clutch body, wherein the clutch body comprises:
      first teeth in a first toothing;
      an axially movable sliding sleeve arrangement with second teeth in a second toothing,
      wherein the sliding sleeve arrangement has a shift ring and a sleeve with the second toothing; and
      a shift fork arranged to engage with the shift ring,
      wherein the shift ring and the sleeve at least partially overlap in axial direction and are arranged to be axially displaceable relative to one another,
      wherein the shift ring and the sleeve enclose an intermediate space, and
      a pneumatic damping that damps a movement of the sleeve and the shift ring relative to one another is formed with the intermediate space,
      wherein in a disengagement position and an engagement position of the first toothing and the second toothing the intermediate space is minimized and in a tooth-on-tooth position the intermediate space is maximized,
      wherein the shift fork is arranged radially in line with the intermediate space.

15. A powertrain for a motor vehicle comprising:
  a first axle;
  a second axle;
  at least one wheel arranged on each side of each axle;
  a traction electric motor is associated with at least one axle;
  a differential gear arranged at the axle;
  a gear ratio step is located between a rotor of the traction electric motor and the differential gear;
  an intermediate shaft is part of the gear ratio step; and
  a dog clutch arrangement arranged at the intermediate shaft comprising:
    a clutch body, wherein the clutch body comprises:
      first teeth in a first toothing;
      an axially movable sliding sleeve arrangement with second teeth in a second toothing,
      wherein the sliding sleeve arrangement has a shift ring and a sleeve with the second toothing; and
      a shift fork arranged to engage with the shift ring,
      wherein the shift ring and the sleeve at least partially overlap in axial direction and are arranged to be axially displaceable relative to one another,
      wherein the shift ring and the sleeve enclose an intermediate space, and
      a pneumatic damping that damps a movement of the sleeve and the shift ring relative to one another is formed with the intermediate space,
      wherein in a disengagement position and an engagement position of the first toothing and the second toothing the intermediate space is minimized and in a tooth-on-tooth position the intermediate space is maximized,
      wherein the shift fork is arranged radially in line with the intermediate space.

16. A motor vehicle comprising:
  a dog clutch arrangement comprises:
    first teeth in a first toothing;
    an axially movable sliding sleeve arrangement with second teeth in a second toothing,
    wherein the sliding sleeve arrangement has a shift ring and a sleeve with the second toothing; and
    a shift fork arranged to engage with the shift ring,
    wherein the shift ring and the sleeve at least partially overlap in axial direction and are arranged to be axially displaceable relative to one another,
    wherein the shift ring and the sleeve enclose an intermediate space, and
    a pneumatic damping that damps a movement of the sleeve and the shift ring relative to one another is formed with the intermediate space,
    wherein in a disengagement position and an engagement position of the first toothing and the second toothing the intermediate space is minimized and in a tooth-on-tooth position the intermediate space is maximized,
wherein the shift fork is arranged radially in line with the intermediate space.

17. The dog clutch arrangement according to claim 5, wherein the sealing element is a lip seal ring.

* * * * *